United States Patent [19]
Yoshida

[11] Patent Number: 4,899,233
[45] Date of Patent: Feb. 6, 1990

[54] APPARATUS FOR REPRODUCING A MAGNETICALLY RECORDED DIGITAL SIGNAL USING A ROTARY HEAD WITH AUTOMATIC TRACK FINDING SIGNAL EXTRACTION AND SELECTION FOR TRACKING CONTROL

[75] Inventor: Shiro Yoshida, Maebashi, Japan

[73] Assignee: Victor Company of Japan, Ltd., Yokohama, Japan

[21] Appl. No.: 171,079

[22] Filed: Mar. 21, 1988

[30] Foreign Application Priority Data

Mar. 20, 1987 [JP] Japan .................................. 62-66534

[51] Int. Cl.$^4$ ................................................ G11B 5/52
[52] U.S. Cl. ............................... 360/77.14; 360/73.11; 360/77.13
[58] Field of Search ............... 360/77.12, 77.13, 77.14, 360/73.04, 73.09, 73.11

[56] References Cited

U.S. PATENT DOCUMENTS

| 4,651,239 | 3/1987 | Omori et al. | 360/77.14 |
| 4,739,420 | 4/1988 | Odaka et al. | 360/77.14 |

FOREIGN PATENT DOCUMENTS

62-154353 7/1987 Japan ................................. 360/77.14

Primary Examiner—Steven L. Stephan
Assistant Examiner—David L. Robertson
Attorney, Agent, or Firm—Fleit, Jacobson, Cohn, Price, Holman & Stern

[57] ABSTRACT

This invention relates to DAT (Digital Audio Tape) equipment. On the magnetic tape, a multiple signal comprising a pulse code modulated sound data of a fixed period obtained by applying pulse code modulation to an audio signal, subcodes time-divisionally multiplexed before and after the pulse code modulated sound data by predetermined time periods, respectively, and a track finding signal is recorded. This recorded signal is allocated onto tracks formed in succession on the magnetic tape by the rotary head and is recorded in a first mode, or in a second mode where its data capacity per unit time is nearly one half of that in the first mode, and a revolving speed of the rotary head and a magnetic tape running speed are nearly one half of those in the first mode. ATF (Automatic Track Finding) signals are included in the recorded signal and are used for tracking control. A circuit arrangement for this ATF signal is provided, which permits only one of the plural kinds of ATF signals to be utilized so that an excellent reproduction can be performed even when the DAT equipment is switched from recording to reproducing mode. When the subcodes are subjected to over-write recording, tracking control is carried out by one ATF signal of the respective reproduced signals obtained by applying one scanning onto a recording track on the magnetic tape using the rotary head.

3 Claims, 9 Drawing Sheets

APPARATUS FOR REPRODUCING A MAGNETICALLY RECORDED DIGITAL SIGNAL USING A ROTARY HEAD WITH AUTOMATIC TRACK FINDING SIGNAL EXTRACTION AND SELECTION FOR TRACKING CONTROL

BACKGROUND OF THE INVENTION

This invention relates to a method and an apparatus for recording and reproducing a digital signal using a rotary head. Particularly, this invention relates to a rotary head type digital signal recording and reproducing apparatus having a recording function to record subcodes for retrieving program number an Automatic Track Finding (which will be abbreviated as ATF hereinafter) signals in conformity with the DAT standard (Industry Standard for the Digital Audio Tape System) on a portion of tape track a fixed time period from the initial end and a portion of tape track a fixed time period immediately before the terminating end of each recording track formed by a rotary head on a magnetic tape, and to record digital audio signals on the track intermediate portion except for the above portions, and a reproducing function to conduct an after-recording operation using one of the above ATF signals at the time after recording (over-write) of the above subcodes, and to carry out a high speed and excellent reproduction of previously recorded signals on the magnetic tape thus recorded.

Figure 11:
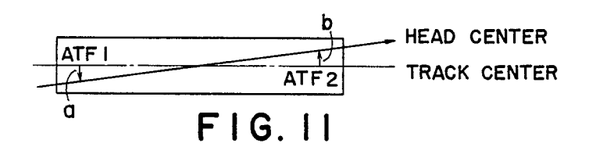
FIG. 11 is a view for explaining an offset between the center of a track and the center of locus defined by scanning of the head.

The background art will be explained with reference to the drawings. In a DAT (Digital Audio Tape Recorder) using a rotary head among those DATs capable of recording pulse code modulated sound data obtained by applying pulse code modulation (PCM) to an analog audio signal on a magnetic tape and reproducing them therefrom, as shown in FIG. 11, the magnetization pattern to be recorded on the magnetic tape is recorded with the azimuth angles of adjacent tracks being different from each other and with guard bands between tracks being absent. In such a DAT, subcodes and ATF signals are recorded on subcode areas and ATF signal areas which are located at a portion of tape a fixed period from the initial end of each track and a portion of tape a fixed period immediately before the terminal end thereof, respectively, and PCM sound data are recorded on PCM sound areas of the track intermediate portion except for the above areas in accordance with a predetermined signal format. The data thus recorded are reproduced.

Figure 7:
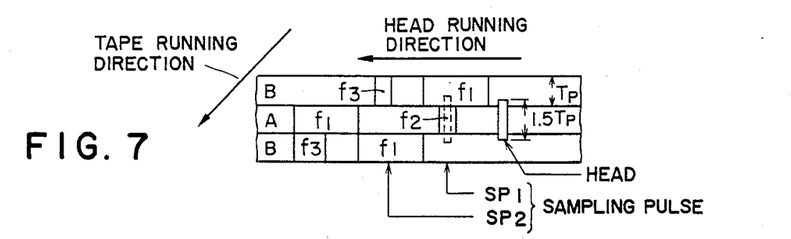
FIG. 7 is a view for explaining the tracking operation when PCM sound data recorded on a track on a magnetic tape is reproduced.

FIG. 7 is a schematic view for explaining the tracking operation when the PCM sound data recorded on the tracks on a magnetic tape is reproduced.

In this figure, B, A and B represent a track, $T_p$ a track pitch, f1 a pilot signal, f2 and f3 synchronizing signals of an ATF signal, and SP1 and SP2 each represent a respective sampling pulse. The frequency of the pilot signal f1 is a low frequency where little azimuth effect occurs. The ATF signals f2 and f3 have two kinds of signal lengths, respectively. The ratios of these signal lengths are "0.5" and "1".

The signal length of the synchronizing signal f3 on the track B of the first step is "0.5" and the signal length of the synchronizing signal f3 on the track B of the third step is "1". According as the head runs on the track A of the second step, the pattern of the synchronizing signal f3 is such that different signal lengths of "0.5" and "1" appear in turn. The signal length of the synchronizing signal f2 on the track A of the second step is "0.5" and the signal length of the synchronizing signal f2 on the track of the fourth step not shown is "1". Thus, accordingly as the head runs on the track B of the first step or the third step, the pattern of the synchronizing signal f2 is such that different signal lengths of "0.5" and "1" appear in turn.

At the time of running of the head, a head having a width 1.5 times larger than the track pitch $T_p$ running on the track of the second step reproduces the synchronizing signals f2 while reproducing crosstalk components of the pilot signal f1 on the track B of the first step. Further, at the time when the sampling pulse SP1 is output, this head carries out sampling of the crosstalk components of the pilot signal f1. After this sampling, immediately after the head has reproduced crosstalk components of the pilot signal f1 on the track B of the first step, it begins reproducing crosstalk components of the pilot signal f1 on the track B of the third step. At the time when a sampling pulse SP2 occurs after a predetermined time from the time when the sampling pulse SP1 has been output, the head carries out sampling of crosstalk components of the pilot signal f1 on the track B of the third step. A signal obtained by extracting the crosstalk components of the pilot signal f1 which has been subjected to sampling by the sampling pulse SP2 from the reproduced signal having been previously subjected to sampling becomes an ATF error signal. Such a sense operation is carried out by the ATF block 3 shown in FIG. 5 which will be described later.

When the PCM sound data is reproduced, the above-mentioned ATF signals and subcodes are used.

There are two kinds of subcodes (subsignals). One is a control signal required for reproducing PCM sound data such as a sampling frequency, or the number of channels, etc. The other is a sub-channel signal for introducing music number, time or image signal attendant thereto. The former subcode is called ID (Identification Code). Particularly, the subcode recorded on a PCM sound data area is called PCM-ID and the subcode recorded on the subcode area is called subcode ID. Since signals recorded on the subcode area (subcode, subcode data, subcode ID, or control ID, etc.) can be subjected to after-recording without being erased irrespective of the PCM sound data, they are utilized for recording a program number of a time code, etc.

Figure 8:
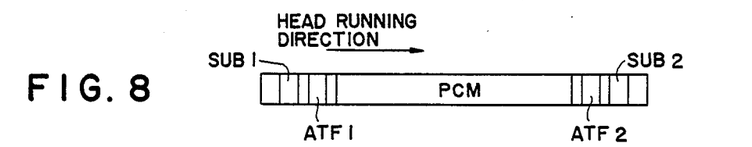
FIG. 8 is a view showing one track pattern on a magnetic tape.

FIG. 8 is a schematic view showing one track pattern on a magnetic tape.

As shown in this figure, the track is composed of, from the left toward the right in the figure, in order to running of the head, a subcode area SUB1, an ATF signal area ATF1, a PCM sound data area PCM, an ATF signal area ATF2, and a subcode area SUB2. The subcode areas SUB1 and SUB2 comprise a subcode, a subcode data, a subcode ID, and a control ID, etc. Graphic data requiring large capacity, etc. are recorded on the subcode data. In addition, time code, etc. are recorded on the subcode ID because only a small data capacity is required.

The control ID is composed of a TOC-ID which is a signal indicating the presence or absence of a TOC (Table of contents), a shortening ID which is a signal indicating a fast feed to a next start ID if this represents "1", a start ID (S-ID) which is a signal indicating the start of the music and the division of music, and a priority ID which is a signal indicating the presence or absence of after-recording of the music. Particularly, since S-ID is a signal indicating the head of the program, it is a useful signal among various kinds of music signals peculiar to DAT. This signal is recorded from the head music, e.g., for nine seconds (standard mode). At the time of reproduction, this signal is searched to detect the head position of music.

Meanwhile, there are at least two kinds of modes for recording and reproducing the PCM sound data. One is a standard mode (first mode) having a sampling frequency of 48 KHz, two channels, and a linear quantization of 16 bits. The other is a non-linear long time mode (or a half-speed mode, second mode) having a sampling frequency of 32 KHz, two channels, and a non-linear quantization of 12 bits. Actually, there are also a mode having a sampling frequency of 44.1 KHz, and a mode having a sampling frequency of 32 KHz, four channels, and a non-linear quantization of 12 bits, etc. Such modes have the same recording/reproducing time as that of the standard mode.

In the half-speed mode, a revolving speed of a rotary drum and a tape running speed are set to values one-half of those in the standard mode, respectively, and a digital signal (precisely speaking, ATF signals and clock pulses for generating PCM sound data) is set to have a frequency one-half of that in the standard mode. Thus, the operating speed of the entirety of the apparatus becomes equal to one-half of that in the standard mode. Accordingly, in the half-speed mode, by allowing the operation speed of the entirety of the apparatus to be one-half of that in the standard mode although sound quality is somewhat degraded as compared to that in the standard mode, it is possible to conduct a recording/reproducing for a time twice longer than that in the standard mode with respect to a magnetic tape of the same length.

The speed for carrying out a fast forward (FF), or a rewinding (REW) of a track recorded by the above-mentioned respective modes is, e.g. 200 times larger than that at the time of a regular speed running in the standard or half-speed mode. For making a high speed search at this speed, it is required to read the program number, the time, and the start ID, etc.

Figures 9, 10:
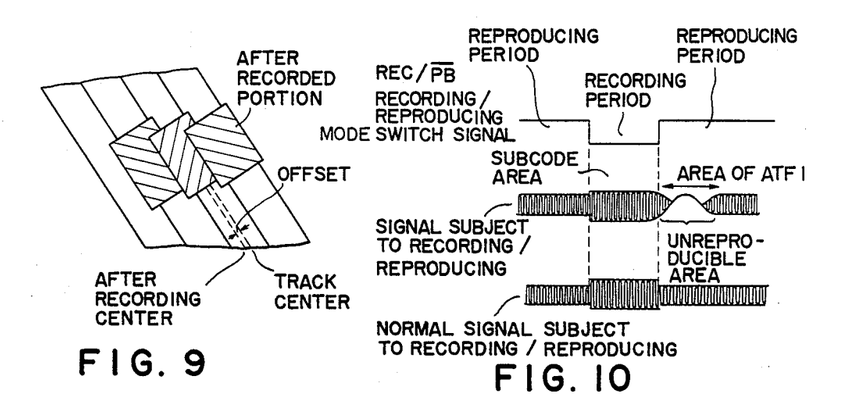
FIG. 9 is a view for explaining after-recording of subcode on a track.
FIG. 10 is a view for explaining that a signal subject to recording/reproducing is distorted by a recording/reproducing mode switching signal.
Figure 12:
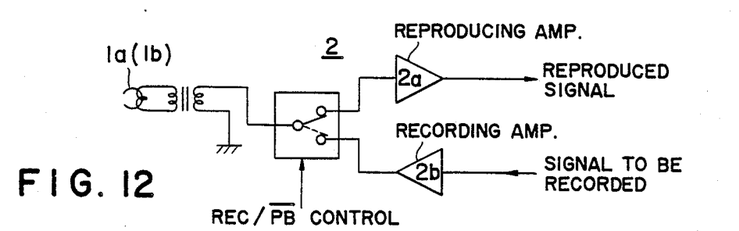
FIG. 12 is a circuit diagram showing an arrangement of a reproducing amplifier and a recording amplifier which are subjected to switching control by a recording/reproducing mode switching signal.

FIG. 9 is a schematic view for explaining that subcodes are subjected to after-recording on tracks; FIG. 10 is a schematic view for explaining that a signal subject to recording/reproducing is distorted by a recording/reproducing mode switching signal; FIG. 11 is a schematic view for explaining an offset between the track center and the locus defined by scanning of the head; and FIG. 12 is a diagrammatical view showing the arrangement in which a reproducing amplifier and a recording amplifier are subjected to switching control by a recording/reproducing mode switching signal.

As shown in FIG. 9, when a subcode on a track is subjected to after-recording, ATF1 and ATF2 signals obtained from heads having different azimuth angles were used to conduct a running position control of the heads so that the heads running on the track run in the center thereof (shown in FIG. 11). However, since the time interval from the reproduction of ATF1 to the reproduction of ATF2 is different from the time interval from the reproduction of ATF2 to the reproduction of ATF1, an offset occurred between the center of the locus defined by scanning of the head for after-recording and the center of the track as indicated by slanting lines in FIG. 9, resulting in a requirement for offset adjustment.

This will be described in greater detail with reference to FIG. 11 wherein a solid line represents the center of the locus defined by scanning of the head and broken lines represent the center of the track. An offset value from the center of the track to the center of the locus defined by scanning of the head is expressed as follows. When a distance from ATF1 to the center of the locus defined by scanning of the head is designated by a, a distance from ATF2 to the center of the locus defined by scanning of the head is designated by b, an inclination of head scanning with respect to this track is designated by e, an offset is designated by $\epsilon$, and letting (Time interval controlled by ATF1):(Time interval controlled by ATF2)=1:r the following relationships hold:

$a:b = r:1$, and $a + b = e$.

From these relationships, $a = \{r/(1+r)\}e$, and $b = e/(1+r)$.

In an ideal tracking condition, $a = b = \frac{1}{2}e$.
In addition, an offset $\epsilon$ is expressed as follows:

$$\epsilon = a - \frac{1}{2}e$$
$$= \frac{1}{2}e\{(r-1)/(r+1)\}.$$

For example, when the curvature e of the track is 5 $\mu$m, the offset $\epsilon$ becomes equal to 0.7 $\mu$m (r=1.78).

As stated above, during the scanning of the head, ATF1 and ATF2 in the ATF signal area of each track were picked up, thus to conduct a tracking control using these signals.

Further, as shown in FIG. 8, the head running on the track reproduces a signal in the ATF signal area ATF1 after reproduction of the subcode in the subcode area SUB1 existing at the initial end of the track. As shown in FIG. 12, a signal to be reproduced from the head 1a (1b) is to be reproduced by the reproducing amplifier 2a through a changeover switch. In this instance, however, the input impedance of the reproducing amplifier 2a is high.

For this reason, immediately after the operation of the head running on the track is switched from recording to reproducing mode, as shown in FIG. 10, a signal to be reproduced is greatly distorted at this switching portion (immediately after the operation is switched from recording to reproducing mode), thus rendering it impossible to reproduce. Since ATF1 exists at this switching portion, this signal is not reproduced. As a result, a head running position control signal for eliminating a tracking error could not be generated from ATF1 and ATF2 on each track, and disturbance of the tracking error occurred, so that an after-recording of the subcode could not be conducted well.

In accordance with the above-mentioned rotary head type digital signal recording/reproducing system, the tracking control of the head is conducted using ATF1 and ATF2 obtained as a result of the fact that heads having different azimuth angles carry out one scanning at the time after recording of the subcode, respectively.

Thus, since the intervals between ATF1 and ATF2 obtained from the heads having different azimuth angles are different, an offset occurred between the head running and the track, resulting in the requirement of offset adjustment.

In addition, when switching of the recording or reproducing amplifier selectively connected to the head is conducted at the time of after-recording of the subcode, particularly at the time of switching from recording to reproducing mode, a signal subject to recording/reproducing was distorted. As a result, the reproduction of ATF1 used for tracking control becomes impossible, so that a good tracking control cannot be conducted. Thus, there was the possibility that the subcode could not be excellently subjected to after-recording in the subcode area.

SUMMARY OF THE INVENTION

To solve the above-mentioned problem, a method and an apparatus for recording and reproducing a digital signal using a rotary head according to this invention wherein a multiple signal, comprising pulse code modulated sound data of a fixed period obtained by applying pulse code modulation to an audio signal, subcodes time-divisionally multiplexed before and after the pulse code modulated sound data by predetermined time periods, respectively, and a track finding signal is recorded on tracks formed in succession by the rotary head on a magnetic tape in a first mode, or in a second mode where its data capacity per unit time is nearly one half of that in the first mode, and a revolving speed of the rotary head and a magnetic running speed are nearly one-half of those in the first mode, thus to reproduce the signal having been recorded on the magnetic tape, is characterized in that when subcodes recorded in the first or second mode are subjected to over-write recording, the tracking control is carried out on the basis of one track-finding signal of the respective reproduced signals obtained by applying one scanning onto a recording track on the recorded magnetic tape using the rotary head.

DETAILED DESCRIPTION OF THE INVENTION

Figure 1:
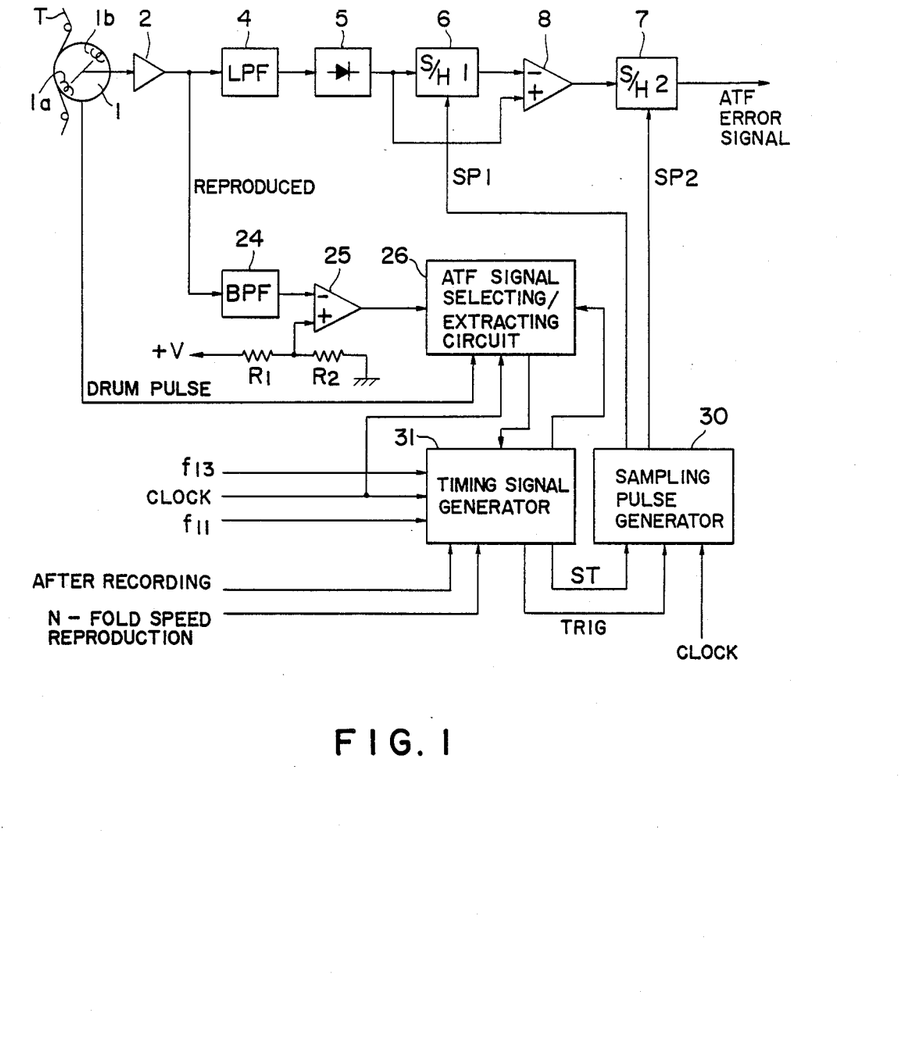
FIG. 1 is a block diagram showing an embodiment of an arrangement for sensing ATF signals which is the essential part of an apparatus according to this invention.
Figure 4:
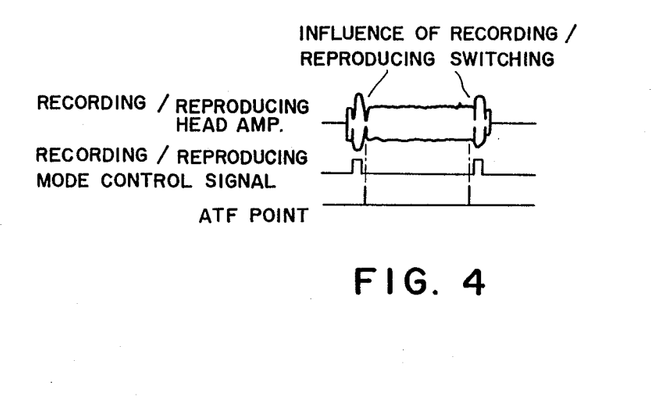
FIG. 4 is a timing chart showing the influence on a reproduced signal at the time of switching from recording to reproducing mode.
Figure 5:
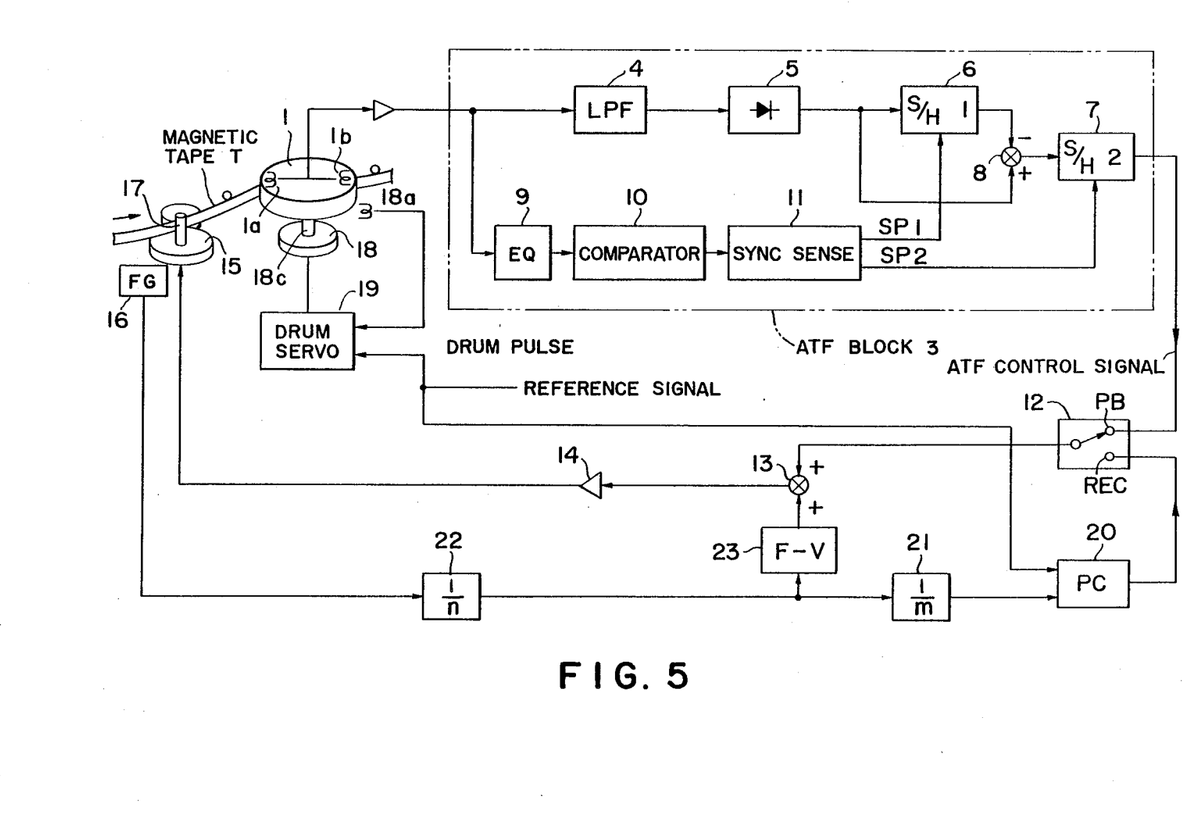
FIG. 5 is a block diagram of a DAT device for explaining the apparatus according to this invention.
Figure 6:
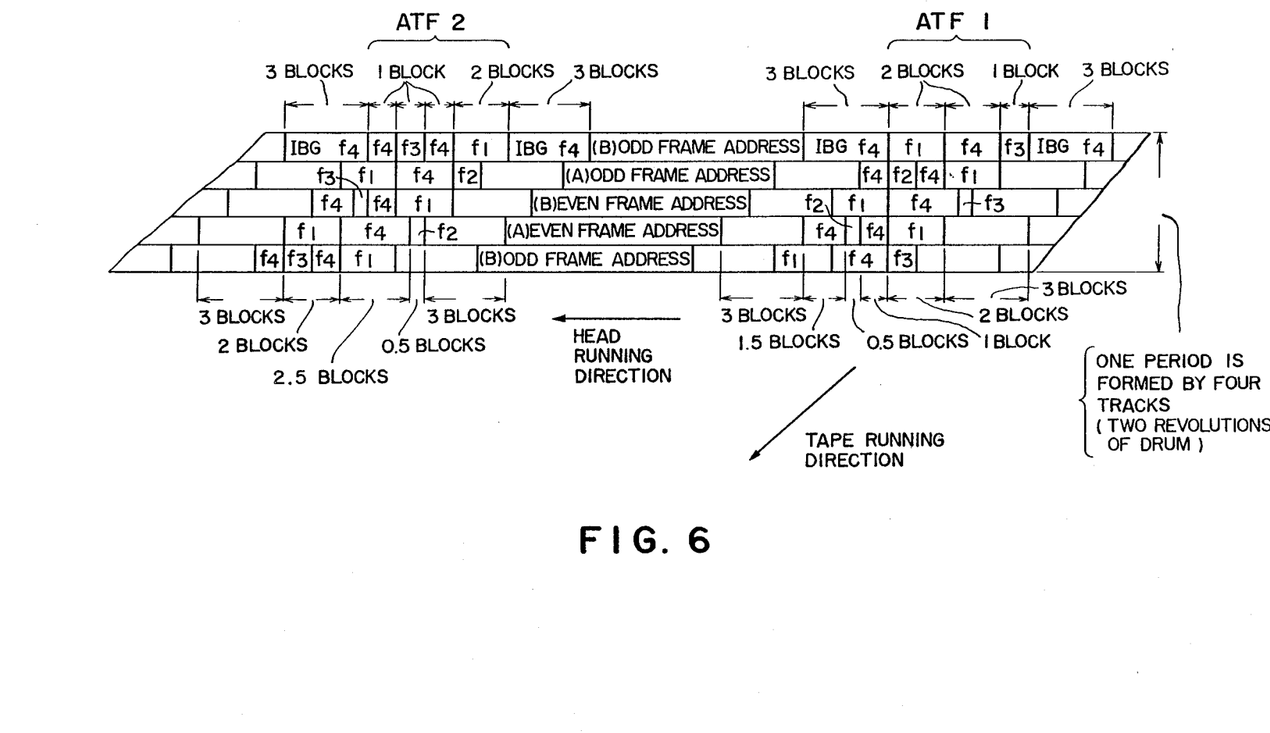
FIG. 6 is a view showing a portion of an ATF track pattern (four track completion type)

FIG. 1 is a block diagram showing an embodiment of an arrangement for sensing an ATF signal, which is the essential part of the apparatus according to this invention. FIGS. 1A, 1B, 1C and 1D are circuit diagrams showing the details of the ATF signal selecting and extracting circuit 26, the timing signal generator 31, the sampling pulse generator 10, and the clock signal forming circuit in the apparatus in FIG. 1, respectively. FIGS. 2A and 2B are timing charts showing waveforms of signals at respective components shown in FIG. 1. FIG. 4 is a view showing the influence on a reproduced signal at the time of switching from recording to reproducing mode. FIG. 5 is a block diagram of a DAT device for explaining apparatus according to this invention. FIG. 6 is a view showing a portion of the ATF track pattern (four track completion type).

The DAT device shown in FIG. 5 includes a rotary drum 1, rotary heads 1a and 1b provided on the rotary drum 1, an amplifier 2, an ATF signal sense circuit (ATF block) 3, a low pass filter (LPF) 4, an envelope detection circuit 5, sample-hold circuits S/H 1 and S/H 2, a subtracter 8, an equalizer (EQ), a comparator 10, an ATF signal sense circuit (SYNC sense 11), a changeover switch 12, an adder 13, a motor drive circuit 14, a capstan motor 15, a frequency generator (FG) 16, a capstan 17, a drum motor 18, a drum servo circuit 19, a phase comparator (PC) 20, a sensor 18a, frequency-dividing circuits (1/m and 1/n) 21 and 22, a frequency-to-voltage converter circuit (F/V) 23, and a magnetic tape T. The amplifier 2 is composed of a reproducing amplifier 2a, a recording amplifier 2b, and a changeover switch (shown in FIG. 12).

On the revolving surface of the rotary drum 1, the rotary head 1a and the rotary head 1b opposite thereto are affixed. The magnetic tape T is wound onto the rotary drum 1 with it being obliquely in contact therewith over an angular range of 90 degrees. Further, it is caused to run in a direction indicated by an arrow with it being supported by the capstan and the pinch roller. The rotary heads 1a and 1b have gaps of which the respective azimuth angles are opposite to each other and are broader than the recording track (e.g., 1.5 times), and which are revolved unitarily with the rotary body 1. The rotary shaft 18c of the drum motor 18 is fixed to the drum.

The ATF signal sense circuit 3 is supplied with a reproduced signal obtained from the rotary head 1a (1b) through the reproducing amplifier 2. This reproduced signal is delivered to the ATF signal sense circuit 11 through the equalizer 9 and the comparator 10, at which ATF signals are sensed from the reproduced signal, whereby sampling pulses SP1 and SP2 are output. The sampling pulse SP1 is delivered to the sample-hold circuit 6 and the sampling pulse SP2 is delivered to the sample-hold circuit 7.

The above-mentioned reproduced signal is also delivered to the envelope detection circuit 5 through the low pass filter 4. After being subjected to envelope detection, this signal as envelope-detected is applied to the sample-hold circuit 6, at which it is subjected to a sample-hold at a timing of the sampling pulse SP1. The signal which has undergone sample-hold is delivered to the minus terminal of the subtracter 8. The signal detected from the envelope detection circuit 5 is delivered to the plus terminal of the subtracter 8. Thus, the subtracter 8 outputs a difference signal obtained by subtracting the signal level having been subjected to sample-hold from the level of the signal as envelope-detected. This difference signal is delivered to the sample-hold circuit 7, at which it is subjected to sample-hold at a timing of the sampling pulse SP2.

Thus, an ATF signal (track finding signal) is output from the sample-hold circuit 7.

This ATF error signal is delivered to the PB terminal of the changeover switch 12 and is then applied to an input terminal of the adder 13 through the changeover switch movable contact. At this adder 13, this signal is added to a signal from the F/V converter circuit 23 applied to the other input terminal thereof. The signal thus obtained is amplified by the motor drive circuit 14, and is then delivered to the capstan motor 15 to perform a speed control of the capstan 17 so as to run magnetic tape T.

The frequency generator 16 generates a frequency signal corresponding to the revolution of the capstan 17. This frequency signal is frequency-divided by the frequency-dividing circuit 22 so that the frequency is reduced to 1/n. Then, the signal thus divided is applied to the F/V converter circuit 23, at which it is converted to a voltage level corresponding to a frequency, thus to be applied to the other input terminal of the adder 13. Thus, the capstan servo control is performed.

The sensor 18a produces a frequency signal corresponding to the revolution frequency of the rotary drum 1. This frequency signal is delivered to one input terminal of the drum servo circuit 19 and a reference signal is delivered to the other input terminal thereof.

On the magnetic tape T recorded by using the above-mentioned DAT device constituted as shown in FIG. 5, an ATF track pattern (four track completion type track pattern) is formed as shown in FIG. 6.

On the central portion {e.g., B head odd frame, (B ODD FRAME ADDRESS)}, PCM signal sound data are recorded. A subcode area SUB1 and an ATF signal recording area ATF1 are recorded from the initial (right bottom in the figure) end of each track and a subcode area SUB2 and an ATF signal recording area ATF2 are recorded immediately before the terminating end thereof (left top in the figure).

ATF signals (Track Finding signals) are recorded on a predetermined section immediately after the initial end of each track and a predetermined section immediately before the terminating end of each track. The ATF signal is composed of a synchronizing signal $f_s$ (f2 or f3) for timing control of sample-hold and a pilot signal $f_p$.

The synchronizing signal $f_s$ is selected so that its frequency is equal to a relatively high frequency having an azimuthal loss effect (e.g. f2 recorded on one of two adjacent tracks is 522 KHz and f3 recorded on the other track is 784 KHz), whereas the pilot signal f1 is selected so that its frequency is equal to such a low frequency (e.g., 133 KHz) having less azimuthal loss effect, i.e., which is reproduced as crosstalk from the adjacent tracks.

The ATF signal section of each track is comprised of a synchronizing signal recording section in which the synchronizing signal $f_s$ is recorded for a predetermined time period, a section in which an erasing signal (designated by f4 in FIG. 6) of, e.g., about 1.57 MHz for erasing a previous signal is recorded, and a pilot signal recording section in which the pilot signal f1 is recorded for a fixed time period, which are provided in succession in order recited. The pilot signal recording section of the next track is disposed so as to adjoin the erasing signal recording section recorded immediately before. Between adjacent tracks, the pilot signal recording sections are arranged so that they are not adjacent to each other and the synchronizing signal recording sections are also arranged in the same manner.

The synchronizing signal $f_s$ for timing control of the sample-hold of the ATF output detected is reproduced only when reproduced using a rotary head having a gap of the same azimuth angle as that of the recording track. When reproduced using a rotary head having a gap of the same azimuth angle as that of the recording track, the pilot signal f1 is of course reproduced and is also reproduced as crosstalk from the adjacent tracks.

The apparatus according to this invention contemplates eliminating an offset between the center of a track and the center of the locus defined by scanning of the head which has been already explained with reference to FIG. 11. Namely, at the time after recording of the subcode, when the head 1a (1b) carries out one scanning, only the ATF2 in the ATF signal recording area of each track is picked up to use this signal for tracking control. Thus, since ATF time points reproduced become equidistant, an offset between each track and the head becomes equal to zero, with the result that an offset voltage becomes unnecessary.

FIG. 1 is a block diagram showing an embodiment of an arrangement for sensing an ATF signal, which is the essential part of the apparatus according to this invention. FIGS. 2A and 2B are timing charts showing waveforms of signals at respective components shown in FIG. 1. In these drawings, the same components as stated above are designated by the same reference numerals, respectively, and their explanation will be omitted. And the embodiment of FIG. 1 is provided with the same circuits and components as the changeover switch 12, the adder 13, the motor drive circuit 14, the capstan motor 15, the frequency generator 16, the capstan 17, the pinch roller, the drum motor 18, the sensor 18a, the drum servo circuit 19, the phase comparator 20, the frequency dividing circuits 21 and 22, and the frequency-to-voltage converter circuit 23 shown in FIG. 5, but they are omitted in FIG. 1 for brevity.

Figure 1A:
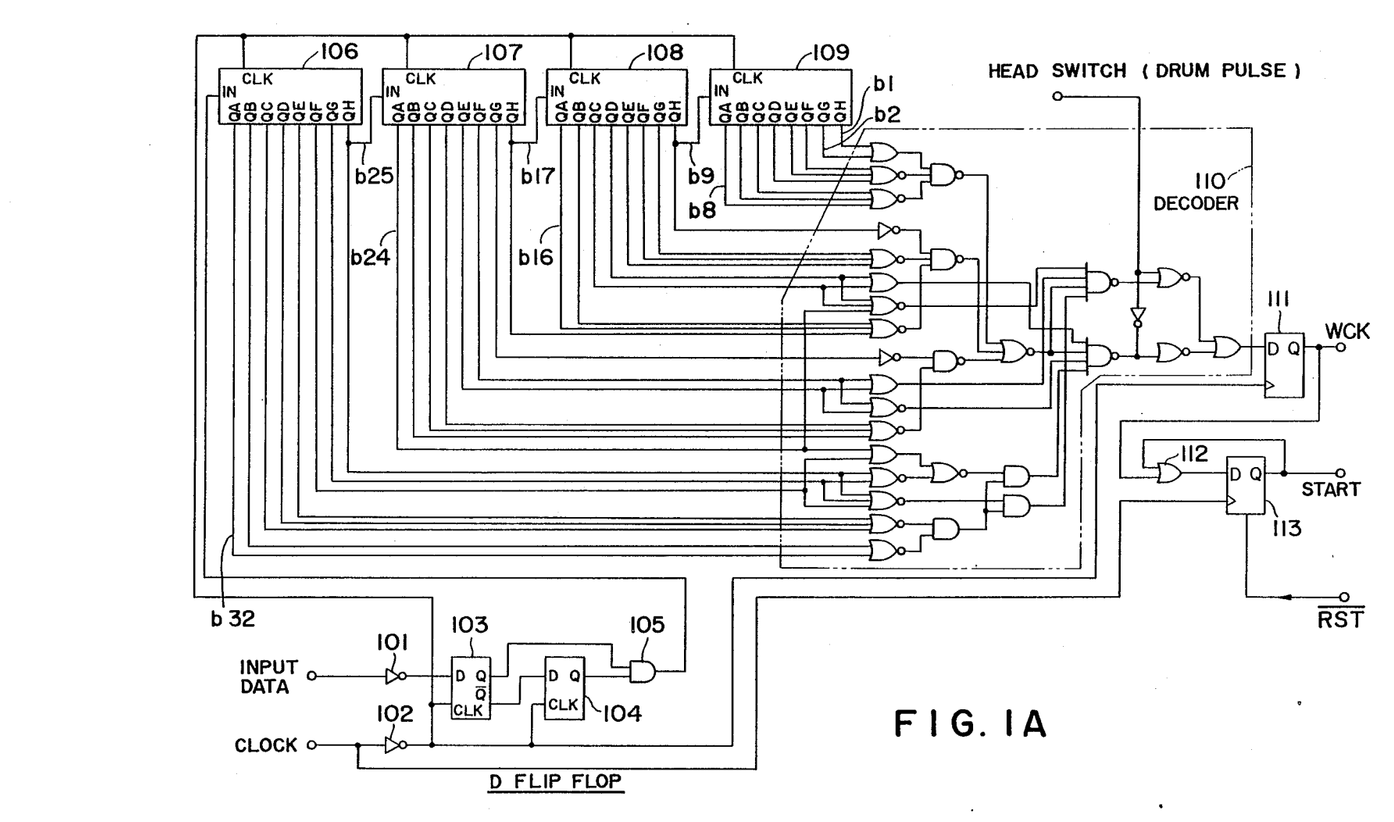
FIG. 1A is a circuit diagram showing the details of the ATF signal selecting and extracting circuit 26 in FIG. 1.
Figure 1B:
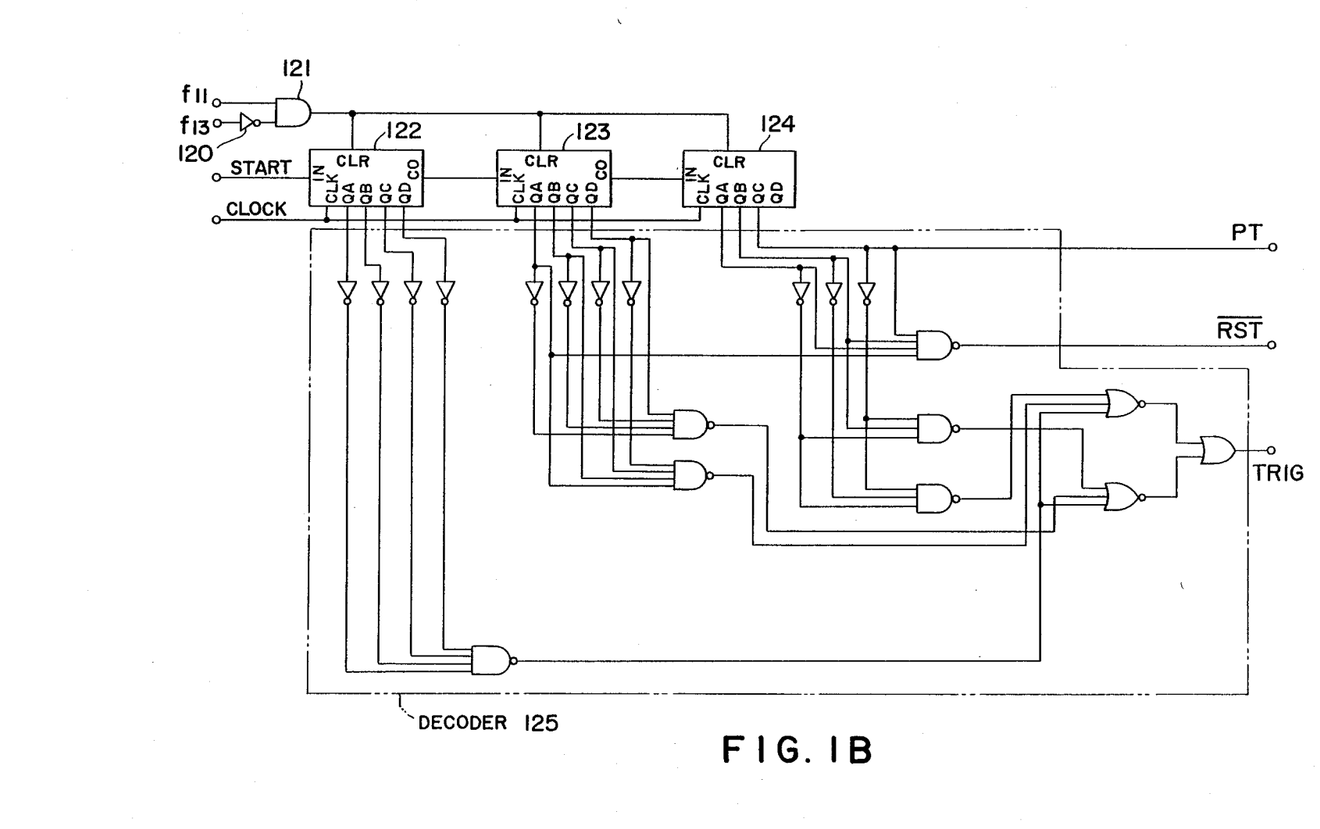
FIG. 1B is a circuit diagram showing the details of the timing signal generator 31 in FIG. 1.
Figure 1C:
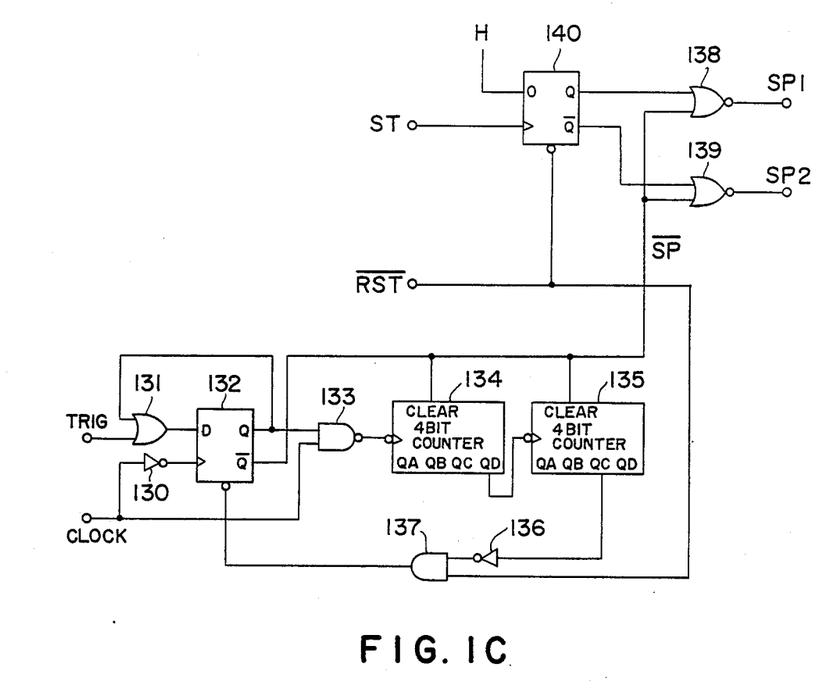
FIG. 1C is a circuit diagram showing the details of the sampling pulse generator 10 in FIG. 1.
Figure 2A:
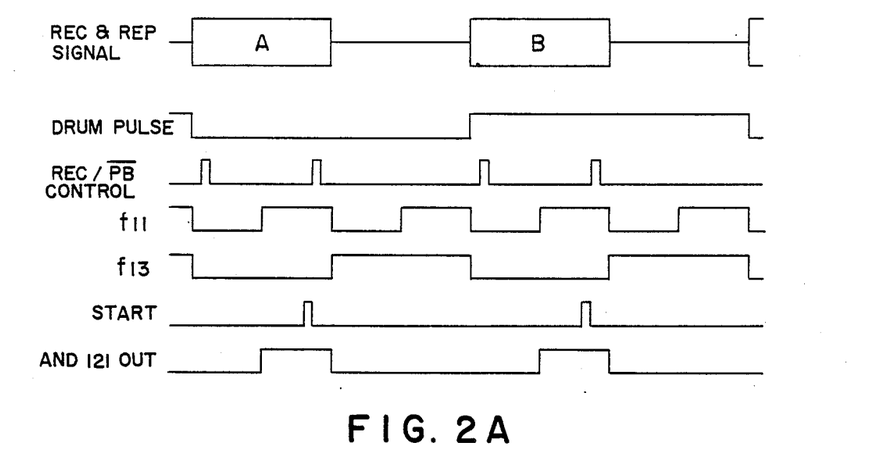
FIGS. 2a and 2B are timing charts showing waveforms of signals at respective circuit components in FIGS. 1, 1A, 1B and 1C.
Figure 2B:
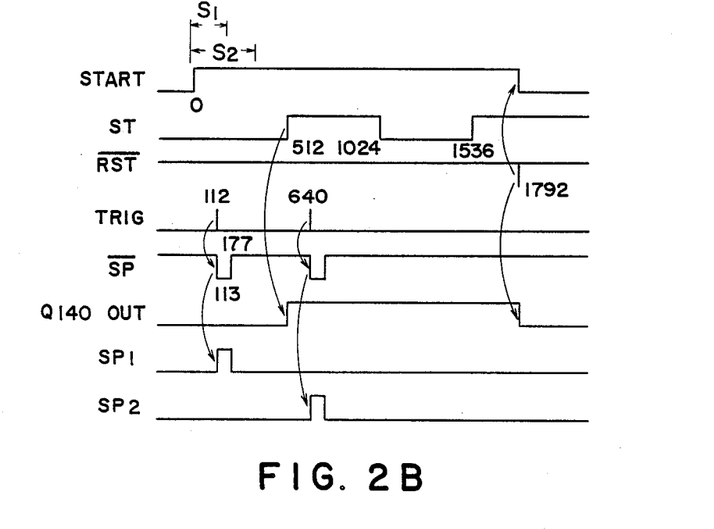

The arrangement for sensing an ATF signal shown in FIG. 1 includes a band-pass filter (BPF) 24, a comparator 25, an ATF signal selecting/extracting circuit 26 (the detail thereof is shown in FIG. 1A), a sampling pulse generator 30 (the detail thereof is shown in FIG. 1C), and a timing signal generator 31 (the detail thereof is shown in FIG. 1B).

Signals subject to reproducing output from the rotary heads 1a and 1b through the amplifier 2 are delivered to the band-pass filter 24, at which the synchronizing signal $f_s$ is separated. As shown in FIG. 2A, subcode recording signals exist on both the end portions of the pulse width of the signal subject to reproducing, respectively. The signal subject to recording/reproducing is also delivered to the low-pass filter 4, at which the pilot signal f1 is separated. A reproduced synchronizing signal $f_s$ taken out from the band-pass filter 24 is applied to the inverting input terminal of the comparator 25, at which that signal is compared with a predetermined voltage level applied to the non-inverting input terminal thereof and is then output to the ATF signal selecting-/extracting circuit 26.

The detail of the ATF signal selecting/extracting circuit 26 is shown in FIG. 1A. Inverters 101 and 102, D-type flip-flops 103 and 104, and an AND gate 105 prepare and output pulses having the same width as the clock period in synchronism with a clock immediately after the rising edge of INPUT DATA (a pulse signal which has passed through the BPF 24 and then undergone waveform shaping by the comparator 25). Such pulses are transferred to sequence within parallel-one serial shift registers 106 to 109 in accordance with the clock.

When it is assumed that values of output data of the final stage output QH of the shift register 109 up to the initial stage output QA of the shift register 106 are expressed as $b_1, b_2, \ldots B_{32}$, as shown in FIG. 1A, respectively, these output data represent the values of the 1-st, 2-nd, ... 32-nd data input to the shift registers 106 to 109 among data stored in the shift registers 106 to 109, respectively. These data $b_1, b_2, \ldots b_{32}$ and the drum pulse DP are delivered to a decoder 110 encompassed by broken lines in FIG. 1A. When the value LV of the following logical expression represents "1", the decoder 110 outputs a signal of high level, while when the value LV is "0", decoder 110 outputs a signal of low level:

$LV = \overline{DP} \times (b_1 = b_2) \times \overline{b_3 b_4} \times \ldots$
$\times \overline{b_{18}} \times (b_{19} + b_{20}) \times \overline{b_{21}} \times \overline{b_{22}} \times \ldots$
$\times \overline{b_{32}} + DP \times (b_1 + b_2(\times \overline{b_3} \times \ldots$
$\times \overline{b_{12}} \times (b_{13} + b_{14}) \times \overline{b_{15}} \times \ldots$
$\times \overline{b_{24}} \times (b_{25} + b_{26}) \times \overline{b_{27}} \times \ldots \times \overline{b_{32}}.$ The above-mentioned logical expression indicates that when DP="0" (low level), hence $\overline{DP}$="1" (the head 1a is activated during this time), $b_1$ or $b_2$ is "1", $b_3$ to $b_{18}$ are all "0", $b_{19}$ or $b_{20}$ is "1", and $b_{21}$ to $b_{32}$ are all "0", LV assumes a logic "1" state. In addition, this logical expression indicates that when DP="1" (high level), hence e,ovs/DP/ =0 (the head 1b is activated during this time), $b_1$ or $b_2$ is "1", $b_3$ to $b_{12}$ are all "0", $b_{13}$ or $b_{14}$ is "1", $b_{15}$ to $b_{24}$ are all "0", $b_{25}$ or $b_{26}$ is "1", and $b_{27}$ to $b_{32}$ are all "0", LV assumes 1. This implies that if a signal reproduced from the track A by the head 1a is a wave having a period of approximately 18 times the clock period, and two waves thereof or more are continued, it is judged that the synchronizing signal $f_2$ is reproduced, and if a signal reproduced from the track B by the head 1b is a wave having a period of approximately 12 times the clock period and three waves thereof or more are continued, it is judged that the synchronizing signal $f_3$ is reproduced, whereby the decoder 110 outputs pulses substantially every 12 clock periods or substantially every 18 clock periods.

Pulses from the decoder 110 are changed to pulses synchronous with the clock by a D-type flip-flop 111 and are then delivered to a D-type flip-flop 113 through an OR gate 112. Since the Q output of the flip-flop 113 is fed back to the data input terminal D thereof, the flip-flop 113 outputs a start signal for allowing the timing signal generator 31 to be operative, which start signal goes high in response to the first pulse of the pulses output from the flip-flop 111 and goes low in response to a reset signal $\overline{RST}$ from the timing signal generator 31. The output from the flip-flop 111 is also utilized for processing PCM signals, etc. as a wave clock WCK. However, since this is not directly relevant to the subject matter of this invention, its detailed explanation is omitted here.

Figure 3:
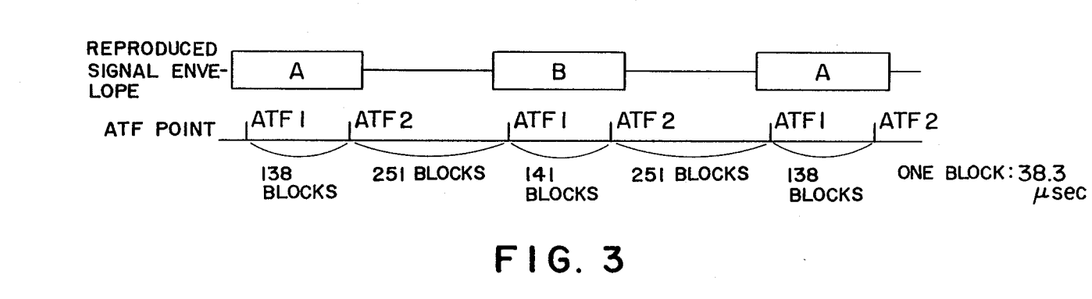
FIG. 3 is a timing chart showing a reproduced signal envelope and an ATF signal.

The ATF signal selecting/extracting circuit 26 selects and extracts the synchronizing signals $f_2$ in the reproduced synchronizing signal to output a select ATF signal. This select ATF signal exists at ATF points shown in FIG. 3. This signal represents an ATF signal in the ATF signal recording area on the side of the initial end or the terminating end of each track, which has been reproduced as a result of the fact that the rotary heads 1a and 1b conduct one scanning. As shown in FIG. 3, the ATF points existing in the reproduced signal envelope A obtained by scanning of the head 1a are ATF1 and ATF2 and the interval therebetween is 138 blocks (one block is 38.3 μm). Further, the interval between ATF1 and ATF2 existing in the reproduced signal envelope B obtained by scanning of the head 1b is 141 blocks. In addition, the interval between ATF2 of the envelope A and ATF1 of the envelope B is 141 blocks.

The timing signal generator 31 is supplied with the select ATF signal from the ATF signal selecting/extracting circuit 26, signals $f_{11}$ and $f_{13}$, a clock and an after-recording (REC/PB) control signal. The after-recording control signal is a signal applied at the time after-recording.

The detail of the timing signal generator 31 is shown in FIG. 1B. On the basis of the signals $f_{11}$ and $f_{13}$, an inverter 120 and an AND gate 121 generate a pulse which goes high at the respective latter halves of time periods during which the heads 1a and 1b scan tracks on the tape. This pulse is delivered to the clear terminals of synchronous 4-bit counters 122 to 124 connected in series to clear these counters at the rising edge thereof. When a start signal from the ATF signal selecting/extracting circuit 26 is incoming (during high level), these counters 122 to 124 count the number of clock pulses. The outputs of the counters 122 to 124 are delivered to a decoder 125. Thus, the decoder 125 outputs a trigger signal TRIG to the sampling pulse generator 30 when the count value of the counters becomes equal to 112 and 640, and outputs a reset signal $\overline{RST}$ to the ATF signal selecting/extracting circuit 26 when the above-mentioned count value becomes equal to 1792. The flip-flop 113 in the ATF signal selecting/extracting circuit 26 is reset by the reset signal $\overline{RST}$. Thus, the start signal is stopped and the count operations of the counters 122 to 124 are also stopped. The QC output of the counter 124 is also output to the sampling pulse generator 30 as a PT signal.

The sampling pulse generator 30 outputs, as shown in FIG. 2B, sampling pulses SP1 and SP2 synchronous with the backward end portions of the maximum levels of the signals A, B, A, ... subject to recording/reproducing (i.e., portions where the subcode recording signal and ATF2 exist).

The detail of the sampling pulse generator 10 is shown in FIG. 1C. Initially, D-type flip-flops 132 and 140 are reset by a reset signal $\overline{RST}$ from the timing pulse generator 31. As a result of the fact that the flip-flop 132 is reset, its $\overline{Q}$ output goes high. Thus, 4-bit counters 134 and 135 connected in series are cleared. When a trigger signal TRIG is incoming, the flip-flop 132 is set. Since the Q output of this flip-flop is fed back to the data input terminal thereof through an OR gate 131, the flip-flop 132 is maintained in a set state until a reset pulse from an AND gate 137 is applied. As a result of the fact that the flip-flop 132 is set and the Q output thereof is allowed to be at a high level, a NAND gate 133 permits clock pulses to pass therethrough. The counters 134 and 135 count clock pulses which have passed. When the count value thereof reaches 64, the QC output of the counter 135 shifts to a high level. Such an output is delivered to the flip-flop 132 through an inverter 136 and the AND gate 137. Accordingly, the flip-flop 132 outputs from the $\overline{Q}$ output terminal thereof negative-going sampling pulse $\overline{SP}$ having a duration of 64 clock periods every time the trigger signal TRIG is incoming. This output is delivered to one respective input terminal of NOR gates 138 and 139.

On the other hand, the flip-flop 140 having a data input terminal to which a high level is applied at all times receives on the clock terminal thereof a signal ST from the timing signal generator 31. Thus, the flip-flop 140 is set. In addition, Q and $\overline{Q}$ outputs of the flip-flop 140 are delivered to other input terminals of the NOR gates 138 and 139, respectively. Accordingly, before the flip-flop 140 receives the signal ST and therefore when it is in a reset state, the Q output thereof is at a low level. Thus, the negative going sampling pulse $\overline{SP}$ passes through the NOR gate 138, whereby its polarity is inverted. The sampling pulse having undergone such a polarity inversion is output to the sample hold circuit 6 as a sampling pulse SP1. On the other hand, after the flip-flop has received the signal ST and therefore when it is in a set state, the $\overline{Q}$ output thereof is at a low level. Thus, the negative going sampling pulse $\overline{SP}$ passes through the NOR gate 139, whereby its polarity is inverted. The sampling pulse having undergone such a polarity conversion is output to the sample hold circuit 7 as a sampling pulse SP2.

Figure 1D:
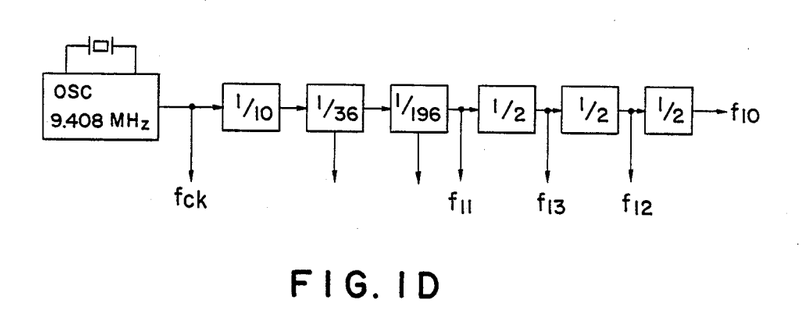
FIG 1D is a block diagram showing a circuit for forming a clock signal used in the apparatus in FIG. 1.

FIG. 1D shows an arrangement of the clock signal forming circuit. The clock is generated by a quartz oscillator and has a frequency $f_{ck}$ of 9.408 MHz. The frequency signal $f_{11}$ is a signal obtained by frequency-dividing the clock into $1/70560 (=1/10 \times 1/36 \times 1/196)$ thereof. Likewise, the frequency signal $f_{13}$ is a signal obtained by frequency-dividing the frequency $f_{11}$ into ½ thereof. The frequency signal $f_{12}$ is a signal obtained by frequency-dividing the frequency $f_{13}$ into ½ thereof. In addition, the frequency signal $f_{10}$ is a signal obtained by frequency-dividing the frequency $f_{12}$ into ½ thereof. Namely, these frequency signals are obtained with the arrangement as shown in FIG. 1D.

It is to be noted that signals obtained from the middle stages of a 1/36 frequency divider and a 1/196 frequency divider are used for processing PCM signals along with the above-mentioned $f_{ck}$, $f_{11}$, $f_{12}$ and $f_{10}$.

FIGS. 2A and 2B are timing charts showing waveforms of signals at respective components shown in FIGS. 1A, 1B and 1C. FIG. 2B is a timing chart showing only the vicinity of the section where the start signal is at a high level, i.e., the portion encompassing the start signal START in FIG. 2a with the time base being relatively expanded as compared to that in FIG. 2a. Numeric values in FIG. 2B represent times from the rise time of the start signal to change times of respective signals with a clock period being one unit. In more detail, FIG. 2B shows one example of the signal sequence as described below. For example, after the start signal has occurred (i.e. gone "high"), a trigger signal TRIG is generated at the following 112-th clock period. This trigger signal is delayed by one clock period by the flip-flop 132 in the sampling pulse generator 31. Thus, a sampling pulse $\overline{SP}$ is output at the 113-th clock period. This sampling pulse $\overline{SP}$ is continued for 64 clock periods $(=177-113)$. In addition, sections labeled S1 and S2 at the left upper portion of the start signal in FIG. 2B represent sections where the synchronizing signal $f_s$ ($f_2$ or $f_3$) is being reproduced.

It is to be noted that respective values of the pilot signal $f_1$, the synchronizing signals $f_2$ and $f_3$, and the erase signal $f_4$ are selected so that they have the following relationship:

$$f_1 = f_{ck}/72 (=130.67 \text{ KHz})$$

$$f_2 = f_{ck}/18 (=522.67 \text{ KHz})$$

$$f_3 = f_{ck}/12 (=784.00 \text{ KHz}), \text{ and}$$

$$f_4 = f_{ck}/6 (=1.568 \text{ MHz}).$$

As just described above, when the rotary head 1a (1b) performs one scanning at the time of after recording of the subcode, ATF2 in the ATF signal recording area of each track is picked up to use it for tracking control, thereby making is possible to carry out after recording of subcode stably at all times.

While the tracking control at the time of the constant speed running in the standard mode has been described in the above-mentioned embodiment, it is needless to say that the concept of the aforesaid tracking control is also applicable to the tracking control at the time of n-fold high speed reproduction (FF and REW) in the standard mode or 2n-fold high speed reproduction in the half-speed mode.

If the problem of the influence of the recording/reproducing switching is solved by another suitable measure (for example, an amplifier having a low input impedance is used for the reproducing amplifier 2a), the ATF1 may be used instead of ATF2.

ADVANTAGES OF THE INVENTION

As described above in detail, in accordance with the system of recording and reproducing a digital signal using a rotary head according to this invention, since tracking control of the head is conducted by using only the ATF2 signal obtained as a result of the fact that heads having different azimuths perform one scanning at the time of after-recording of the subcode, respectively, the intervals between ATF2 and ATF1 obtained from the heads having different azimuths become equal to each other. Accordingly, there is no possibility that an offset occurs between the running head and the track, with the result that offset adjustment becomes unnecessary. In addition, also at the time of switching to the recording or reproducing amplifier selectively connected to the head, particularly at the time of switching from the recording mode to reproducing mode, the ATF2 signal used for tracking control is reproduced excellently at all times. Thus, an excellent tracking control can be obtained and after-recording of subcodes onto the subcode areas can be excellently carried out.

What is claimed is:

1. An apparatus for reproducing a recorded digital signal using a rotary head which recorded digital signal is a multiple signal including pulse code modulated sound data of a fixed time period duration obtained by applying a pulse code modulation to an audio signal, subcodes time-divisionally multiplexed before and after said pulse code modulated sound data by predetermined time periods, respectively, and a track finding signal, and which recorded digital signal is recorded on tracks formed in succession on a magnetic tape by a rotary head in a first mode, or in a second mode where its data capacity per unit time is nearly one-half of that in said first mode and in which second mode a revolving speed of said rotary head and a magnetic tape running speed are nearly one-half of those in said first mode, thus to reproduce a signal including cross-talk components of a pilot signal from an adjacent track and having been recorded on said recorded magnetic tape, said apparatus comprising:

an automatic track finding signal selecting and extracting circuit means for forming a start signal by using input data read from said tape and a clock;

a timing signal generating circuit means for responding to said start signal from said automatic track finding signal selecting and extracting circuit means to count clock periods, thus to generate a trigger signal every time the count value thereof reaches a first predetermined value and to form a reset signal every time said count value thereof reaches a second predetermined value larger than said first predetermined value;

a sampling signal generating circuit means reset by said reset signal and counting clock periods, for forming a sampling signal every time said sampling signal generating circuit means counts a predetermined number of clock periods in accordance with said trigger signal;

a sensing circuit means for sensing an automatic track finding signal in said reproduced signal in accordance with said sampling signal from said sampling signal generating circuit means; and means for generating a tracking error signal from said sampling signal and said cross-talk components.

2. An apparatus for reproducing a digital signal using a rotary head as set forth in claim 1, wherein said automatic track finding signal selecting and extracting circuit means comprises:

a circuit for forming a serial pulse train corresponding to said input data on the basis of said input data and said clock periods, a circuit for forming parallel pulses from said serial pulse train, and a decoder for receiving said parallel pulses to make a logical discrimination therefrom on the basis of a predetermined logical expression, thus to produce a pulse output corresponding to the discriminated result.

3. An apparatus for reproducing a digital signal using a rotary head as set forth in claim 2, wherein said timing signal generating circuit means generates said trigger signal every time the clock count value thereof reaches said first predetermined value and said second predetermined value larger than said first predetermined value, and generates said reset signal every time said clock count value thereof reaches a third predetermined value larger than said first and second predetermined values.

* * * * *